US008041339B2

(12) United States Patent
Teunissen et al.

(10) Patent No.: US 8,041,339 B2
(45) Date of Patent: Oct. 18, 2011

(54) METHOD FOR SECURE AUTHENTICATION OF MOBILE DEVICES

(75) Inventors: Harold Wilhelm Antonie Teunissen, Deventer (NL); Jacco Brok, Enschede (NL); Ko Marcus Joannes Louis Lagerberg, Hengelo (NL); Miroslav Zivkovic, Enschede (NL)

(73) Assignee: Alcatel Lucent, Paris (FR)

( * ) Notice: Subject to any disclaimer, the term of this patent is extended or adjusted under 35 U.S.C. 154(b) by 1382 days.

(21) Appl. No.: 11/343,733

(22) Filed: Jan. 31, 2006

(65) Prior Publication Data

US 2007/0178882 A1 Aug. 2, 2007

(51) Int. Cl.
*H04M 1/66* (2006.01)

(52) U.S. Cl. ...................... 455/411; 455/410; 455/552.1

(58) Field of Classification Search .................. 455/410, 455/411, 408, 421, 426.1, 426.2, 450, 41.1, 455/41.2, 556.2, 557, 556, 435.1; 235/462.01, 235/454, 472.02, 375, 380; 703/3, 5, 51, 703/44; 340/825.49
See application file for complete search history.

(56) References Cited

U.S. PATENT DOCUMENTS

| | | | | |
|---|---|---|---|---|
| 6,230,002 | B1 * | 5/2001 | Floden et al. | 455/411 |
| 6,871,063 | B1 * | 3/2005 | Schiffer | 455/410 |
| 7,561,691 | B2 * | 7/2009 | Blight et al. | 380/247 |
| 2003/0096595 | A1 * | 5/2003 | Green et al. | 455/411 |
| 2004/0153555 | A1 * | 8/2004 | Haverinen et al. | 709/229 |
| 2006/0036855 | A1 * | 2/2006 | Simonen | 713/168 |
| 2006/0172700 | A1 * | 8/2006 | Wu | 455/41.2 |
| 2007/0004381 | A1 * | 1/2007 | Larson et al. | 455/411 |
| 2007/0060056 | A1 * | 3/2007 | Whitaker et al. | 455/41.2 |
| 2007/0108269 | A1 * | 5/2007 | Benco et al. | 235/380 |
| 2008/0117884 | A1 * | 5/2008 | Ishii et al. | 370/338 |
| 2008/0227434 | A1 * | 9/2008 | Nitta et al. | 455/414.1 |
| 2010/0279612 | A1 * | 11/2010 | Harwood et al. | 455/41.2 |

FOREIGN PATENT DOCUMENTS

| | | | |
|---|---|---|---|
| EP | 1 237 333 | A1 | 10/2001 |
| WO | 03/081934 | A1 | 10/2003 |
| WO | 2004/090800 | A3 | 10/2004 |

OTHER PUBLICATIONS

PCT Search Report for International Patent Application No. PCT/US2007/002497; Jul. 31, 2007.

* cited by examiner

*Primary Examiner* — Jean Gelin
(74) *Attorney, Agent, or Firm* — Williams, Morgan & Amerson, P.C.

(57) ABSTRACT

A method for authenticating a mobile device is provided. The method includes receiving a communication request from the mobile device. The mobile device is operable to exchange data over a primary channel. Authentication data is received from the mobile device over a second channel. The secondary channel is a short-range channel operable for exchanging data when the mobile device is within physical proximity. The authentication data is processed to determine whether the mobile device is a trusted device.

20 Claims, 3 Drawing Sheets

300 Receiving a communication request from a mobile device, wherein the mobile device is operable to exchange data over a primary channel.

305 Receiving authentication data from the mobile device over a secondary channel, wherein the secondary channel is a short-range channel operable to exchange data when the mobile device is within physical proximity.

310 Processing the authentication data to determine whether the mobile device is a trusted device.

METHOD FOR SECURE AUTHENTICATION OF MOBILE DEVICES

BACKGROUND OF THE INVENTION

1. Field of the Invention

This invention relates generally to communication systems, and, more particularly, to wireless communication systems.

2. Description of the Related Art

Wireless communication systems are commonly employed to provide voice and/or data communications. Existing and emerging wireless communication systems are generally comprised of heterogeneous collections of air-interface technologies, network architectures, and wireless protocols. For example, wireless communication systems may operate using IEEE-802.11 (Wi-Fi) wireless networks that provide access to local area and "hotspot" networks, Bluetooth connectivity, IEEE-802.16 (WiMax) networks that provide fixed wireless and mobile broadband access, Evolution Data Optimized networks (1xEVDO) that provide access to third generation (3G) mobile data users, and the like.

Wireless communications introduce a new degree of security risk over conventional land-based systems. In a wireless environment, adversaries are able to more easily eavesdrop on communications because information is sent over a wireless link that is considered more accessible than conventional land-based channels. Moreover, with the proliferation of mobile devices (e.g., laptop computers, cell phones, personal digital assistances, and the like), users are becoming increasingly susceptible to adversary attacks attempting to gain unauthorized access to stored data.

In public settings, for example, such as an airport terminal, adversaries may attempt to eavesdrop on wireless communications to intercept authentication data, such as passwords, media access control (MAC) addresses, personal identification numbers (PINs), security keys, and the like. Adversaries may use this information to gain unauthorized access to wireless communication systems and/or other mobile devices. To illustrate this point, in the case of the Bluetooth protocol, an adversary may eavesdrop during the pairing of mobile devices. As used herein, the terms 'authentication', 'authenticate', 'pairing', and 'pair' are intended to be used interchangeably to generally refer to algorithms, processes, mechanisms, and/or data used to establish trusted communications. During the pairing process, the adversary may "listen" to intercept the PIN(s) of one or more mobile devices. With this information, the adversary may decode data required to pair itself with one or more of the mobile devices participating in the wireless communication. If successful, the adversary may gain unauthorized access to personal data, such as calendar data, address books, email, credit card information, and the like.

An exemplary attack algorithm is described, for example, in a paper titled "Cracking the Bluetooth PIN" by Yaniv Shaked and Avishai Wool; the contents of which are hereby incorporated by reference. In this paper, with respect to the Bluetooth protocol, the authors describe a shortcoming that exists in relying solely on an n-digit PIN to pair one mobile device with another. In particular, the authors describe an algorithm that can be used with an intercepted PIN of a mobile device to "crack" conventional Bluetooth authentication mechanisms in less than a second. Other protocols used in different wireless technologies, such as Wi-Fi, 1xEVDO, and the like, suffer from similar deficiencies in that adversaries have proven successful in intercepting authentication data and using this data to gain unauthorized access to confidential data.

What is needed, therefore, is an authentication mechanism that, when called upon, better ensures only trusted mobile devices are permitted to pair with one another and/or exchange data with a wireless communication network.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one aspect of the present invention, a method of authenticating a mobile device is provided. The method includes receiving a communication request from the mobile device. The mobile device is operable to exchange data over a primary channel. Authentication data is received from the mobile device over a secondary channel. The secondary channel is a short-range channel operable for exchanging data when the mobile device is within physical proximity. The authentication data is processed to determine whether the mobile device is a trusted device.

In another aspect of the present invention, a method of authenticating a mobile device is provided. The method includes transmitting a communication request from the mobile device. The mobile device is operable to exchange data over a primary channel. Authentication data is transmitted from the mobile device over a secondary channel. The secondary channel is a short-range channel operable for exchanging data with a receiving party when the mobile device and the receiving party are within physical proximity. The receiving party processes the authentication data to determine whether the mobile device is a trusted device.

BRIEF DESCRIPTION OF THE DRAWINGS

The invention may be understood by reference to the following description taken in conjunction with the accompanying drawings, in which like reference numerals identify like elements, and in which.

Figure 1:
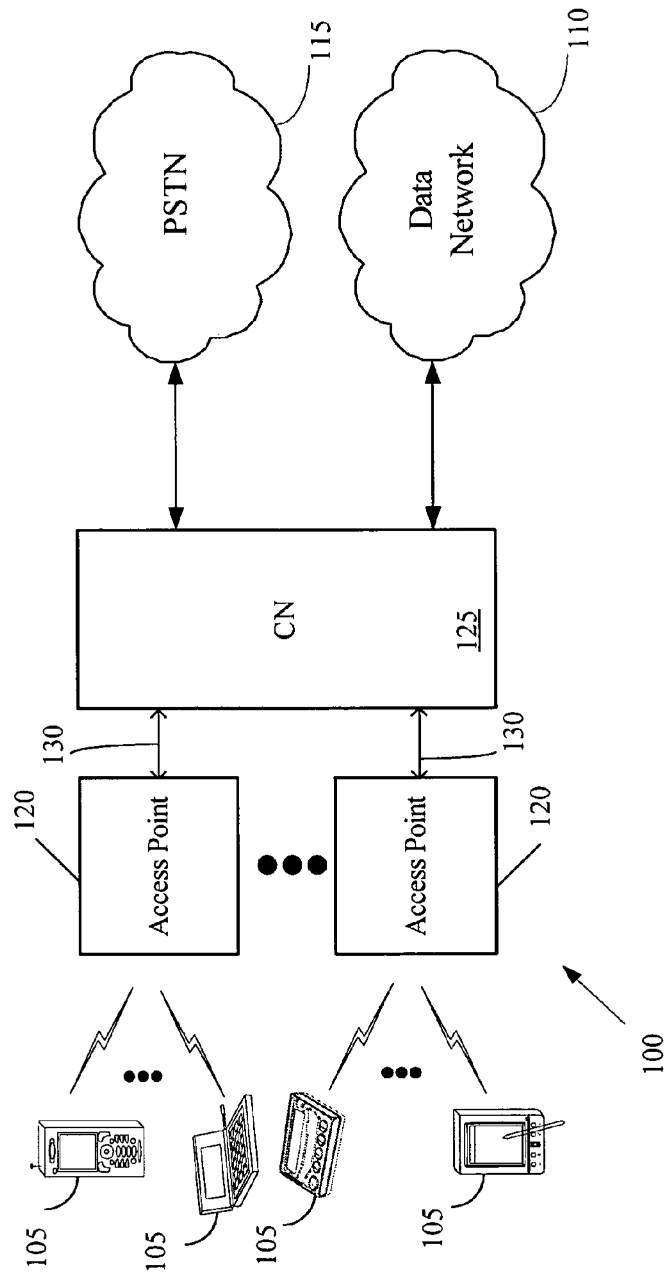
FIG. 1 is a simplified block diagram of an illustrative wireless communication network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive), optical (e.g., a compact disk read only memory, or "CD ROM"), or based on other technologies and may be read only or random access. Similarly, the transmission medium may be twisted wire pairs, coaxial cable, optical fiber, wireless transmission, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Turning now to the drawings, and specifically referring to FIG. 1, a wireless communications network 100 is illustrated. The terms "wireless communication network", "mobile network", and "wireless network" are used interchangeably herein to generally describe a communication network that is operable to provide mobile communication to its subscribers. For example, the wireless communication network 100 may be a 1xEVDO network that is generally compliant with technical specifications and technical reports for a 3$^{rd}$ Generation Mobile System that have been developed by a 3$^{rd}$ Generation Partnership Project (3GPP). It should be understood, however, that the present invention may be applicable to wireless communication networks supporting other wireless protocols, such as Wi-Fi, Bluetooth, WiMax, and the like.

The wireless communication network 100 allows one or more mobile devices 105 to communicate with a data network 110, such as the Internet, and/or a Publicly Switched Telephone Network (PSTN) 115 through one or more access points 120 (e.g., base stations, Wi-Fi transceivers, etc.). The mobile devices 105 may take the form of any of a variety of devices, including cellular phones, personal digital assistants (PDAs), laptop computers, digital pagers, wireless cards, and any other similar type electronic device. In one embodiment, a plurality of the access points 120 may be coupled to a core network (CN) 125 by one or more connections 130, such as T1/EI lines or circuits, ATM circuits, cables, digital subscriber lines (DSLs), and the like. Moreover, the communication network 100 may be comprised of other devices (not shown), such as radio network controllers (RNC), management processors, and the like.

Generally the CN 125 operates as an interface to a data network 110 and/or to the PSTN 115. The CN 125 may perform a variety of functions and operations, such as user authentication. However, as will be described more fully below, the process of authenticating a mobile device 105 for trusted communication may be performed by any number of devices in the communication network 100, such as the access point 120 or other devices (not shown). Moreover, for mobile-to-mobile communications (e.g., master/slave, peer-to-peer, etc.), the authentication processing may be performed by one or more mobile devices 105. Therefore, it will be appreciated that a detailed description of the structure and operation of the CN 125 is not necessary to an understanding and appreciation of the instant invention. Accordingly, to avoid unnecessarily obfuscating the instant invention, further details of the CN 125 are not presented herein.

Those skilled in the art will appreciate that the wireless communication network 100 facilitates communications between the mobile devices 105, the data network 110 and/or the PSTN 115. It should be understood, however, that the configuration of the wireless communication network 100 is exemplary in nature, and that fewer or additional components may be employed in other embodiments of the communications system 100 without departing from the spirit and scope of the instant invention.

Figure 2:
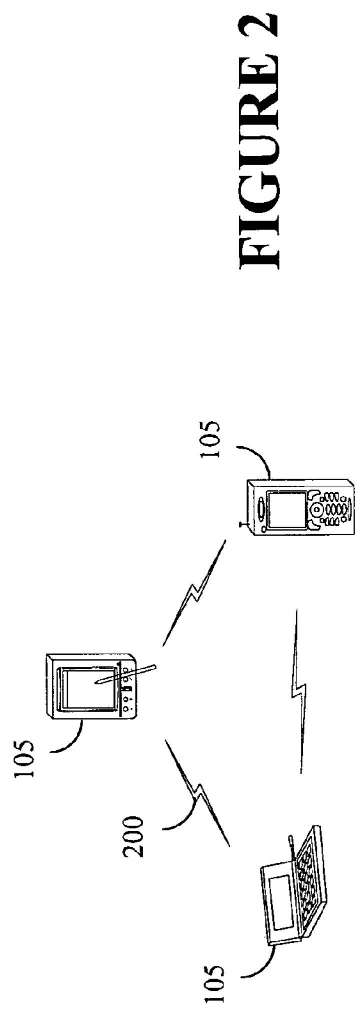
FIG. 2 is a simplified block diagram illustrating mobile-to-mobile wireless communication between one or more mobile devices.

FIG. 2 illustrates mobile-to-mobile communication between a plurality of mobile devices 105. Although only three mobile devices 105 are illustrated for this particular example, it should be appreciated that mobile-to-mobile communication is possible between two or more mobile devices 105. Furthermore, although not shown, one or more of the mobile devices 105 may also be in data communication with a communication network, such as the communication network 100 illustrated in FIG. 1. When one or more mobile devices 105 are in data communication with a communication network, it should be appreciated that under certain configurations other mobile devices 105 may communicate (e.g., exchange data) with the communication network, via the mobile-to-mobile communication.

Mobile-to-mobile communication may be implemented using any number of known or to be developed wireless technologies and protocols. In FIG. 2, the mobile devices 105 are shown communicating over a primary channel 200. The primary channel 200 is typically a radio frequency channel, but other wireless technologies such as infrared, optical, and the like may be used as well. Likewise, the primary channel 200 may be configured to conform to any number of known or to be developed protocols, such as IEEE 802.3 (Ethernet), code-division multiple access (CDMA), Bluetooth, global system for mobile communication (GSM), and the like.

Figure 3:
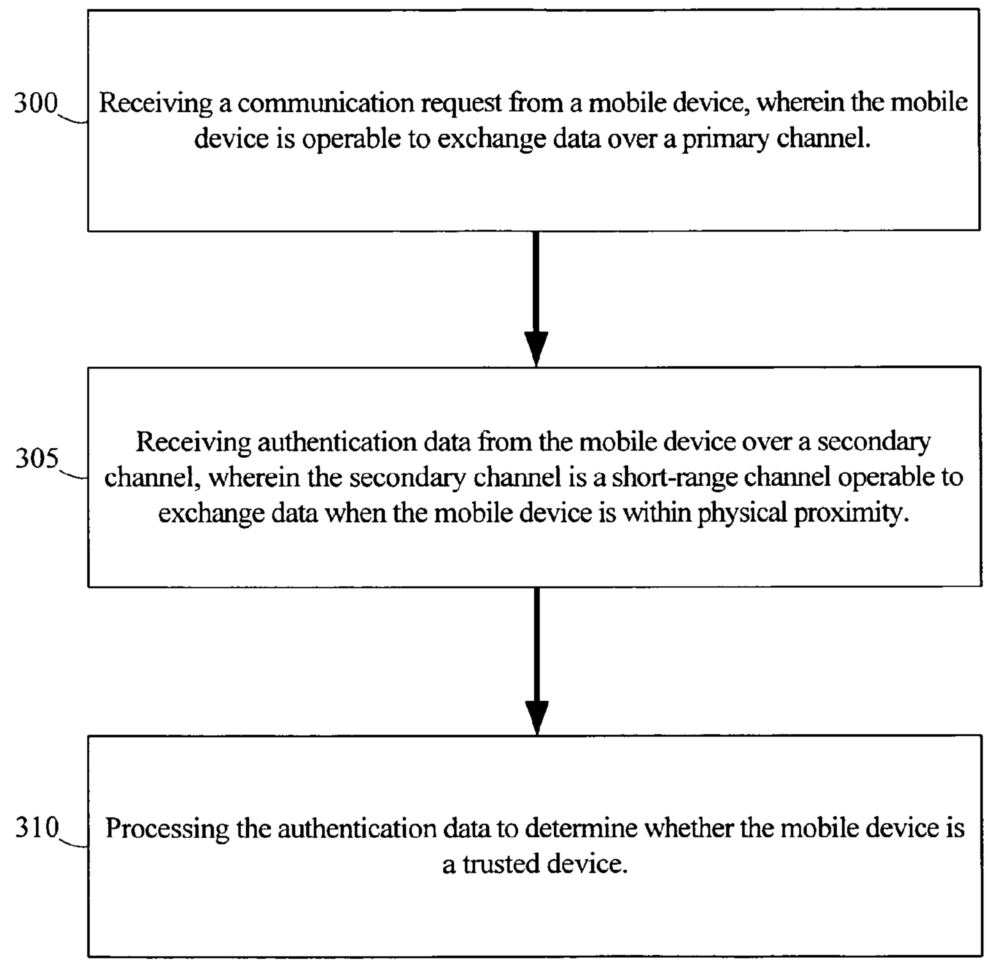
FIG. 3 conceptually illustrates one exemplary embodiment of a method of authenticating a mobile device in accordance with one embodiment of the present invention.

Referring to FIG. 3, an illustrative method for authenticating a mobile device 105 in accordance with the present invention is shown. For ease of description, the method is described with reference to the communication network 100 and the mobile-to-mobile communication shown in FIGS. 1 and 2, respectively. It should be appreciated, however, that the method is equally applicable to other wireless networks and mobile-to-mobile configurations.

At block 300, a communication request is received from a mobile device 105. As described, the mobile device 105 is operable to communicate over a primary channel 200. The primary channel 200 is the intended data communication channel for a given wireless technology and typically provides the mobile device 105 some freedom of movement, while maintaining the data communication. In a Wi-Fi network, for example, the primary channel is ordinarily a radio frequency channel between the mobile device 105, an access point 120, and/or another mobile device 105. For Bluetooth communications, the primary channel 200 is typically realized between two or more mobile devices 105. However, the primary channel 200 may also include communication with other devices, such as desktop computers, electronic kiosks, or any other electronic device capable of interpreting the communication request.

Figure 4:
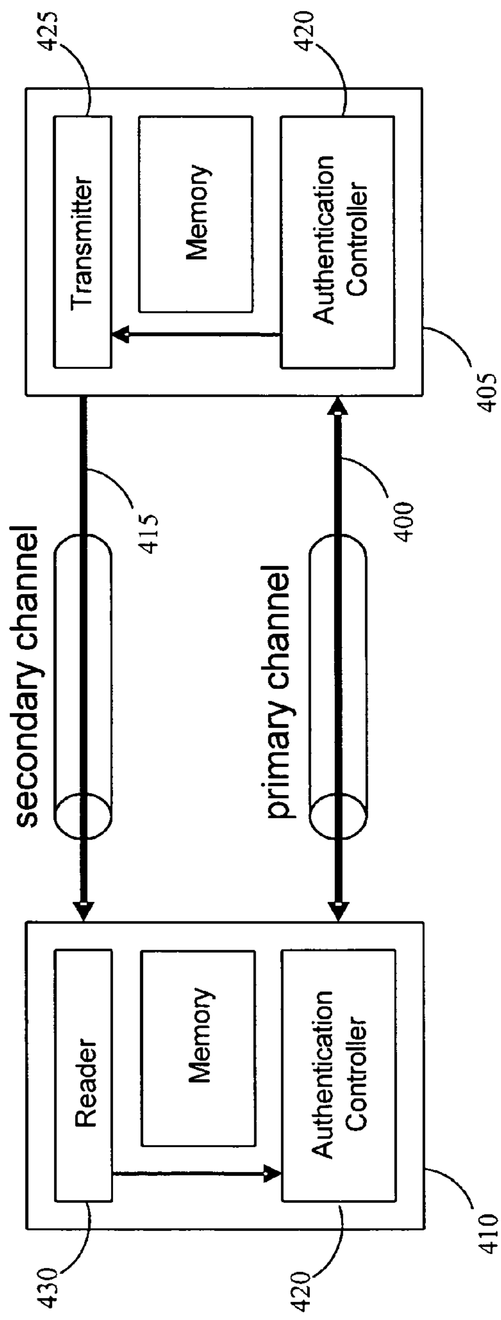
FIG. 4 is a simplified block diagram illustrating the authentication method shown in FIG. 3 in accordance with one embodiment of the present invention.

Referring to FIG. 4, a primary channel 400 for data communication is shown between a first device 405 and a second device 410. In one embodiment, both the first and second devices 405, 410 are mobile devices, and the primary channel 400 is a mobile-to-mobile communication channel. In another illustrative embodiment, only one of the devices 405, 410 is a mobile device, and the other is an access point to a communication network. Generally, the first and second devices 405 and 410 may be any electronic device capable of wireless communication. Furthermore, it should be appreciated that additional electronic devices (not shown) may also be capable of communicating with the first and second devices 405, 410 using the primary channel 400.

As will be described below, to establish a trusted communication between the two devices 405, 410 (i.e., pair the devices 405, 410) and/or other devices (not shown), a secondary channel 415 that is operable for short-range communication is used to exchange authentication data. To simplify the illustration of the authentication process, the examples will primarily focus on the case where the secondary channel 415 is used to pair two or more mobile devices. However, as has already been described, the invention is not so limited, and it should be appreciated that the secondary channel 415 may be realized between a mobile device 105 and a fixed device and/or any number of other wireless configurations.

In the illustrative example shown in FIG. 4, the second device 410 receives a communication request from the first device 405. For example, the communication request may be a signal from the first device 405 indicating an intent to pair with the second device 410. The communication request is ordinarily generated by a device desiring to initiate wireless communication. It should be understood that the communication request may be generated by any device to indicate a desire to participate in wireless communication.

The form of the communication request may vary depending upon the wireless technology. Ordinarily, the request includes data the receiver will recognize and interpret as a communication request. Moreover, the communication request may be transmitted over the primary channel 400 and/or the secondary channel 415. As described, the secondary channel 415 is a short-range channel that utilizes physical proximity to exchange data, whereas, relative to the secondary channel 415, the primary channel 400 is a longer range channel permitting greater physical mobility. In one illustrative embodiment, the communication request is the authentication data communicated over the secondary channel 415, described more fully below.

Referring back to FIG. 3, at block 305, authentication data is received from the mobile device 105 over the secondary channel 415. As described, the secondary channel 415 is a short-range channel that relies on physical proximity to exchange data. As opposed to the primary channel 400, which permits greater separation distance, the secondary channel 415 requires the mobile device to be placed proximate the device it is attempting to authenticate with. This physical proximity makes it more difficult, if not impossible, for an adversary to pair with another party without detection. This is because, during the paring process, the adversary can no longer rely on the primary channel 400 to maintain a safe distance from its target.

In one illustrative embodiment, the secondary channel 415 is realized using radio frequency identification (RFID) technology. One advantage of RFID is that it does not require direct contact or line-of-sight scanning, but it does rely on the physical proximity advantage described for the secondary channel 415. Referring to FIG. 4, in the illustrative case of RFID, the first device 405 may be equipped with an RFID tag (not shown). In this example, the RFID tag may be part of an authentication controller 420. It should be appreciated, however, that the authentication controller 420 and other components shown for the first and second devices 405 and 410 are intended for the purpose of illustration and not limitation. Those skilled in the art will appreciate that the functionality described herein may be configured to be operable with less than or more than the components shown in the accompanying Figures and that the actual system configuration may vary as a matter of design choice.

The RFID tag may be active or passive. An active RFID tag is typically associated with its own power source, whereas passive tags are RFID tags without a power source. Passive tags are ordinarily temporarily activated by the radio frequency scan of a reader. However, the particular configuration and operation of active and passive RFID tags may vary depending upon the particular application.

In FIG. 4, the first device 405 is equipped with a transmitter 425, such as an antenna, for transmitting data associated with the RFID tag to another device. When activated, the RFID tag ordinarily generates a signal that includes identification data such as an identification number. In this illustrative example, the second device 410 is configured with a reader 430 for receiving the data associated with the RFID tag of the first device 405.

The working distance of RFID is ordinarily far less than typical wireless technologies, such as Bluetooth, Wi-Fi, and the like. With passive RFID, for example, the secondary channel 415 used for transmitting RFID data (i.e., authentication data) is typically about 1 meter or less. In the case of Bluetooth, the primary channel is ordinarily around 10 meters. Accordingly, RFID enforces the physical proximity desired to reduce or possibly eliminated unauthorized pairing. In practice, for example, a user with a mobile device 105 equipped with an RFID tag would be required to physically hold his or her mobile device 105 approximately 50 cm or closer to the other party in order to read/exchange RFID data. It would be difficult, if not impossible, for an adversary to come within such close physical proximity and still avoid detection. In another illustrative example, both parties 405 and 410 are configured with RFID tags, transmitters 425, and readers 430. In this example, both parties 405, 410 and any other party wishing to pair can exchange RFID data to determine whether the parties are trusted.

Referring back to FIG. 3, at block 310, the received authentication data is processed to determine whether the mobile device 105 is a trusted device (i.e., determine whether it is an authorized device that is attempting to pair). In the RFID example above, the RFID tag generates the authentication data, which as described may include identification data. The identification data may include any binary string of data operable for uniquely identifying the mobile device 105. The second device 410 reads the authentication data and passes it to the authentication controller 420.

The authentication controller 420 may be configured to determine whether it is a trusted device that is attempting to pair. In one illustrative example, the authentication data may be used as a parameter input into an authentication algorithm programmed on the authentication controller 420. In other words, the RFID information may be used as a seed for the pairing process. After processing the RFID information through its programmed authentication algorithm, the authentication controller 420 may determine whether an expected result is returned. If so, the authentication controller 420 determines that it is communicating with a trusted device and allows the paring process to be completed.

It should be appreciated that the complexity of the authentication algorithm used for processing the authentication data (e.g., RFID information) may vary as a matter of design choice. In a simple case, the authentication controller 420 may compare the authentication data with stored values to determine if a match exists. If so, the sending device is deemed a trusted device. In a complex case, the authentication data exchanged over the secondary channel 415 may be configured to vary at certain intervals, such that it serves as a nonce (i.e., time varying parameter) for the authentication algorithm. For example, the RFID information may be configured to vary at some predetermined time interval, such as every 5 seconds. This variation in authentication data reduces the opportunity for an adversary to read the same RFID information at a later stage. Depending upon the configuration of the authentication algorithm, the receiver may have to be synchronized with the sender, thus making it even more difficult for a would-be adversary to gain unauthorized access to a mobile device 105.

Referring back to block 305 of FIG. 3, in another example, the authentication data exchanged over the secondary channel 415 may be information encoded on a bar code. With this example, the reader 430 of the second device may be a bar code reader, such as a camera, scanner, laser, or similar device for capturing bar code information. Increasingly, mobile devices 105 are being equipped with cameras. This trend will likely continue as providers of mobile devices 105 continue to endeavor to add more functionality. Such cameras may be used to capture an image of the bar code such that authentication data encoded in the bar code may be decoded and used to determine whether the party associated with the bar code is a trusted party. As described for the RFID example, the mobile device 105 may be configured to process the authentication data decoded from the bar code using any number of different authentication algorithms.

Typically, to capture an image of a bar code, the receiver—the second device 410 in the example of FIG. 4—is required to be within physical proximity of the bar code. With conventional cameras, this is typically made possible with a range of approximately 1 meter or less. Accordingly, the physical proximity of the secondary channel 415 is realized when the camera captures an image of the bar code. In this example, the secondary channel 415 is an optical channel using visual line-of-sight as opposed to the radio frequency channel described for the RFID example.

The bar code encoding the authentication data may be a one-dimensional or two-dimensional bar code. One difference between one-dimensional and two-dimensional bar codes is that the latter one are easier to read with low-quality cameras such as are applied in mobile devices.

A bar code may encode a sufficient amount of authentication data so that the receiving party is not required to store additional data to authenticate the party. It should be appreciated, however, that the particular encoding scheme may vary as a matter of design choice and that the subsequent processing of data decoded from the bar code may vary depending upon the particular application.

In one illustrative embodiment, the bar code may be permanently embossed on a physical medium, such as plastic card (e.g., credit card) that may be carried by the user. In another example, the bar code may be embossed on a user's mobile device 105. In yet another embodiment, the bar code may be electronically generated on the display of the mobile device 105.

Figure 5:
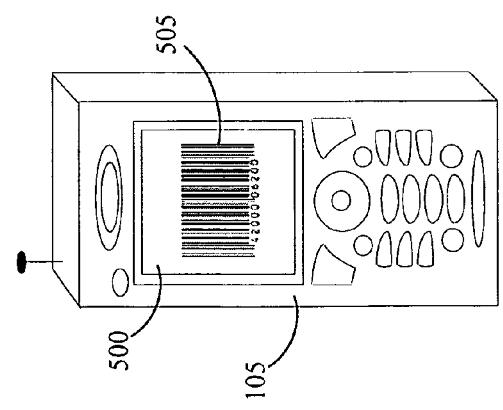
FIG. 5 is a simplified diagram of a mobile device illustrating an authentication mechanism in accordance with one embodiment of the present invention.

Referring to FIG. 5, a simplified representation of a mobile device 105 is shown. In this example, the mobile device 105 is equipped with a display 500. Most, if not all, mobile devices 105 include a display as part of their user interface. The display 500 may be used to present a bar code 505 for reading by another party. That is, the bar code 505 may be presented on the display 500 while the mobile device 105 is in proximity of the reader 430 (e.g., camera) of another party. When the camera of the reading party is activated, an image of the bar code 505 is captured, thus transferring the encoded authentication data over the secondary channel 415.

When presented on a display, bar codes may be easily changed on a regular basis. Similar to varying RFIDs, periodically changing bar codes according to a predetermined schedule or in a random manner adds an additional security mechanism to thwart would-be adversaries. This is especially true if the authentication algorithm is designed such that the parties must be synchronized for paring to be successful.

With the secondary channel 415, other mobile devices 105 attempting to pair using only the primary channel 400 may be ignored. Because both parties 405, 410 involved in the authentication process are in physical proximity, an explicit trust relationship is established. That is, because of the physical proximity of the devices, both parties 405, 410 can physically see who they are pairing with. The physical proximity is enforced by the short-range nature of the secondary channel 415 regardless of the technology employed (e.g., RFID, bar codes, etc.)

If the parties 405, 410 desire to maintain the physical proximity necessary for authentication, the secondary channel 415 may be used to exchange other information, while the connection exists. Because of the short-range nature of the secondary channel 415, it can be expected, however, that this connection will exist only for a short time.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for authenticating a mobile device, comprising:
- receiving a communication request from the mobile device, wherein the mobile device is operable to exchange data over a primary channel;
- receiving authentication data related to the communication request from the mobile device over a secondary channel, wherein the secondary channel is a short-range channel operable for exchanging data when the mobile device is within physical proximity; and
- processing the authentication data to determine whether the mobile device is a trusted device.

2. The method of claim 1, wherein the communication request is received by a second mobile device, and the secondary channel is a mobile-to-mobile channel between the first and second mobile devices.

3. The method of claim 2, wherein the authentication data is processed by the second mobile device to pair the first and second mobile devices.

4. The method of claim 1, wherein the secondary channel is a radio frequency channel operable to exchange the authentication data between a distance of about 1 m or less.

5. The method of claim 4, wherein the authentication data is a radio frequency identification (RFID) tag.

6. The method of claim 1, wherein the authentication data is time-varied by the mobile device according to a predetermined time interval.

7. The method of claim 1, wherein the secondary channel is an optical channel operable to exchange the authentication data between a distance of about 1 meter or less.

8. The method of claim 7, wherein the authentication data includes data encoded on a bar code, and receiving the authentication data further comprises capturing an image of the bar code using a camera.

9. The method of claim 8, wherein the bar code is electronically generated and presented on a display of the mobile device.

10. A method of authenticating a mobile device, comprising:
- transmitting a communication request from the mobile device, wherein the mobile device is operable to exchange data over a primary channel;
- transmitting authentication data related to the communication request from the mobile device over a secondary channel, wherein the secondary channel is a short-range channel operable for exchanging data with a receiving party when the mobile device and the receiving party are within physical proximity, and wherein the receiving party processes the authentication data to determine whether the mobile device is a trusted device.

11. The method of claim 10, wherein the receiving party is a second mobile device, and the secondary channel is a mobile-to-mobile channel between the first and second mobile devices.

12. The method of claim 10, wherein the secondary channel is a radio frequency channel operable to exchange the authentication data between a distance of about 1 m or less.

13. The method of claim 12, wherein the authentication data is a radio frequency identification (RFID) tag.

14. The method of claim 10, wherein the authentication data is time-varied according to a predetermined time interval.

15. The method of claim 10, wherein the secondary channel is an optical channel operable to exchange the authentication data between a distance of about 1 meter or less.

16. The method of claim 15, wherein the authentication data includes data encoded on a bar code, and the receiving party processes the authentication data by performing the steps comprising:
- capturing an image of the bar code using a camera; and
- decoding the bar code to recover the encoded authentication data.

17. The method of claim 16, wherein the bar code is electronically generated and presented on a display of the mobile device.

18. The method of claim 16, wherein the bar code is varied according to a predetermined time interval.

19. A method for authenticating a mobile device, comprising:
- receiving a communication request from the mobile device, wherein the mobile device is operable to exchange data over a primary channel;
- receiving time-varying authentication data related to the communication request from the mobile device over a secondary channel, wherein the secondary channel is a short-range channel operable for exchanging data when the mobile device is within physical proximity, and the received authentication data is varied by the sender according to a predetermined time interval; and
- processing the authentication data to determine whether the mobile device is a trusted device.

20. The method of claim 19, wherein receiving time-varying authentication data from the mobile device comprises synchronizing a receiver with the sending mobile device.

* * * * *